(12) United States Patent
Rathina Balan et al.

(10) Patent No.: US 9,069,900 B2
(45) Date of Patent: Jun. 30, 2015

(54) METHOD FOR DETERMINING WHETHER A MACHINE CODE INSTRUCTION OF A MACHINE CODE PROGRAM IS EXECUTED IN THE MACHINE CODE PROGRAM

(71) Applicant: Intel Mobile Communications GmbH, Neubiberg (DE)

(72) Inventors: Thalaiappan Rathina Balan, Bangalore (IN); Chandran Balamurugan, Bangalore (IN)

(73) Assignee: INTEL MOBILE COMMUNICATIONS GMBH, Neubiberg (DE)

( * ) Notice: Subject to any disclaimer, the term of this patent is extended or adjusted under 35 U.S.C. 154(b) by 83 days.

(21) Appl. No.: 13/852,108

(22) Filed: Mar. 28, 2013

(65) Prior Publication Data

US 2014/0298299 A1 Oct. 2, 2014

(51) Int. Cl.
*G06F 9/44* (2006.01)
*G06F 11/36* (2006.01)
*G06F 11/34* (2006.01)

(52) U.S. Cl.
CPC ........ *G06F 11/3668* (2013.01); *G06F 11/3466* (2013.01)

(58) Field of Classification Search
CPC .................. G06F 11/3676; G06F 11/3466
USPC ................................................ 717/127, 131
See application file for complete search history.

(56) References Cited

U.S. PATENT DOCUMENTS

| | | | | |
|---|---|---|---|---|
| 3,707,725 | A * | 12/1972 | Dellheim | 714/38.12 |
| 4,511,961 | A * | 4/1985 | Penton | 711/201 |
| 4,910,663 | A * | 3/1990 | Bailey | 714/34 |
| 5,050,168 | A * | 9/1991 | Paterson | 714/35 |
| 5,748,515 | A * | 5/1998 | Glass et al. | 708/525 |
| 5,784,602 | A * | 7/1998 | Glass et al. | 712/220 |
| 6,002,881 | A * | 12/1999 | York et al. | 712/34 |
| 6,907,515 | B2 * | 6/2005 | Seal et al. | 712/209 |
| 7,418,580 | B1 * | 8/2008 | Campbell et al. | 712/227 |
| 7,650,596 | B2 * | 1/2010 | Correa | 717/130 |
| 8,225,293 | B2 * | 7/2012 | Correa | 717/130 |

OTHER PUBLICATIONS

Joe-Ming Cheng, ARM 9 Instruction Set Architecture Introduction with Performance Perspective, 2004.*
ARM1176JZ-S™ Technical Reference Manual, Nov. 27, 2009, Sections 2.8, 2.12, p. 2-17, pp. 2-36-2-58, Revision: r0p7.

* cited by examiner

*Primary Examiner* — Phillip H Nguyen

(57) ABSTRACT

A method for determining whether a machine code instruction of a machine code program is executed in the machine code program may include: replacing at least a part of a first machine code instruction of a plurality of first machine code instructions with a second machine code instruction, the second machine code instruction configured to generate a code exception; executing the machine code program including the second machine code instruction; and determining whether the second machine code instruction is executed based on the code exception.

22 Claims, 14 Drawing Sheets

Continuation of drawing sheet 4/14
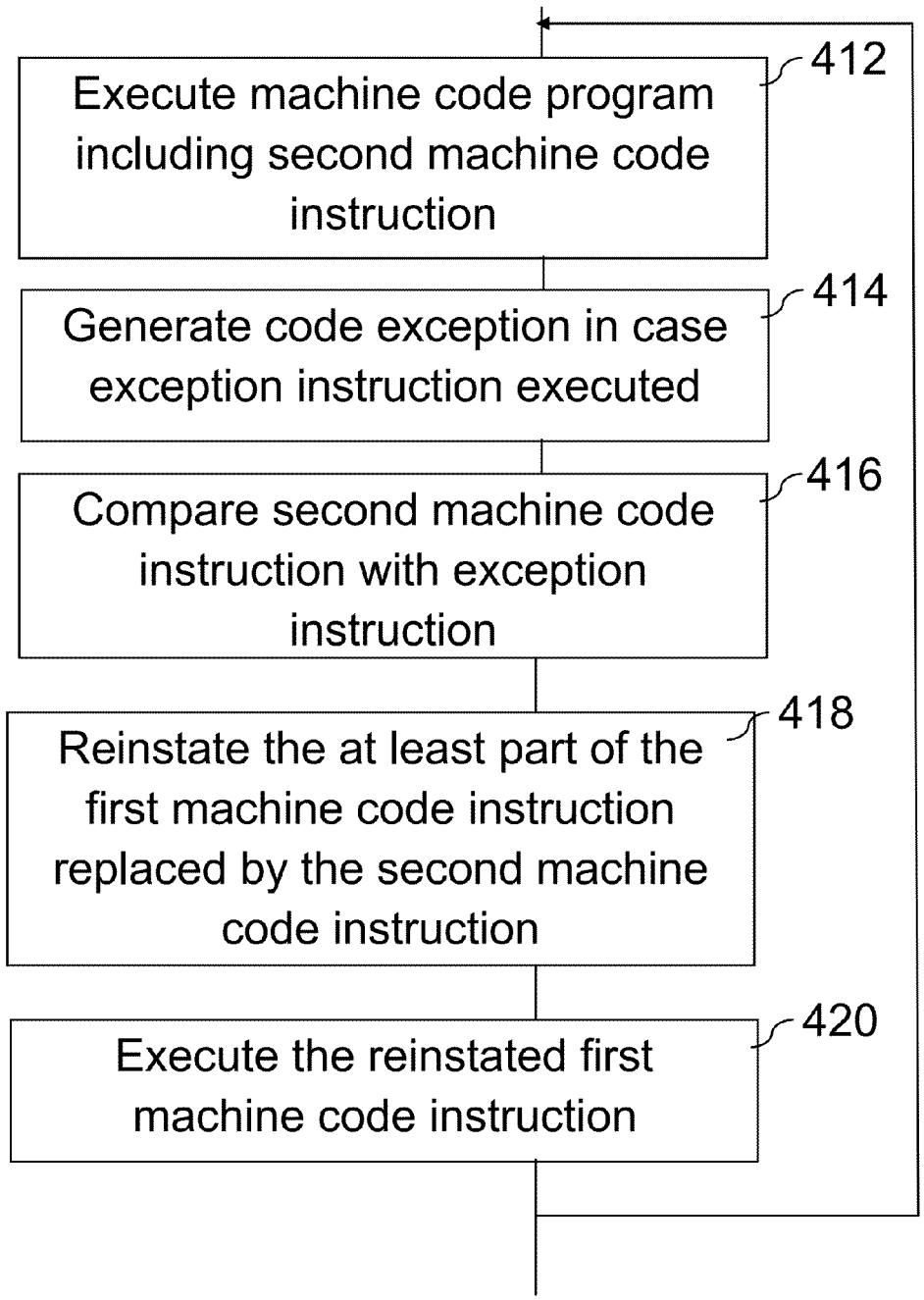
Continued on drawing sheet 6/14
FIG. 4 (Continued)

Continuation of drawing sheet 5/14

502

502-1  
502-2  ‾000000    e92d407c    PUSH     {r2-r6,lr}
502-3  ‾000004    e1b04000    MOVS     r4,r0
       ‾000008    e3a00000    MOV      r0,#0
502-4 — 00000c    e3e05003    MVN      r5,#3
502-5  ⁀000010    e58d0004    STR      r0,[sp,#4]
502-6  ⁀000014    e58d0000    STR      r0,[sp,#0]
502-7  ⁀000018    0a000046    BEQ      |L6.312|
502-8  ⁀00001c    e5d40008    LDRB     r0,[r4,#8]

504

504-1  
504-2  ‾000000    e92d407c    PUSH     {r2-r6,lr}
504-3  ‾000004    e1b04000    MOVS     r4,r0
       ‾000008    e3a00000    MOV      r0,#0
504-4 — 00000c    e3e05003    MVN      r5,#3
504-5  ⁀000010    e58d0004    STR      r0,[sp,#4]
504-6  ⁀000014    e58d0000    STR      r0,[sp,#0]
504-7  ⁀000018    0a000046    BEQ      |L6.312|
504-8  ⁀00001c    e5d40008    LDRB     r0,[r4,#8]

509

506-1
502-2 — 000000   e7f0e7f0   UNDEF
502-3 — 000004   e1b04000   MOVS   r4,r0
       — 000008   e3a00000   MOV    r0,#0
502-4 — 00000c   e3e05003   MVN    r5,#3
502-5 — 000010   e58d0004   STR    r0,[sp,#4]
502-6 — 000014   e58d0000   STR    r0,[sp,#0]
502-7 — 000018   0a000046   BEQ    |L6.312|
506-8 — 00001c   e7f0e7f0   UNDEF

504-1
502-2 — 000000   e92d407c   PUSH   {r2-r6,lr}
502-3 — 000004   e1b04000   MOVS   r4,r0
       — 000008   e3a00000   MOV    r0,#0
502-4 — 00000c   e3e05003   MVN    r5,#3
502-5 — 000010   e58d0004   STR    r0,[sp,#4]
502-6 — 000014   e58d0000   STR    r0,[sp,#0]
502-7 — 000018   0a000046   BEQ    |L6.312|
506-8 — 00001c   e7f0e7f0   UNDEF

;;;703 res &= (BOOL)(DMA_FLOWCTRL_LAST_ELEMENT > p_dma_cfg->flowctrl);

000084 e5941028    LDR   r1,[r4,#0x28]

00008c a3a01000    MOVGE r1,#0  602

000090 b3a01001    MOVLT r1,#1

000094 e0012002    AND   r2,r1,r2

104: 701:    res &= (BOOL)(DMA_FLOWCTRL_LAST_ELEMENT > p_dma_cfg->flowctrl);

104: 701-block  0 branch   0 taken  104 (fallthrough)

branch   1 taken  0

104: 701-block  1 unconditional  2 taken 104

;;;703 res &= (BOOL)(DMA_FLOWCTRL_LAST_ELEMENT > p_dma_cfg->flowctrl);

000084  e5941028  LDR   r1,[r4,#0x28]
    00008c  a3a01000  MOVGE r1,#0
    000090  b3a01001  MOVLT r1,#1
    000094  e0012002  AND   r2,r1,r2

236: 344: if((((symbolic==INT_VALUE) && ((protocol & UICC_PROTOCOL_MASK) == UICC_T_1)) ||

236: 344-block 0 branch 0 taken 20 (fallthrough)

branch 1 taken 216

20: 344-block 1 branch 2 taken 15 (fallthrough)

branch 3 taken 5

231: 344-block 2 branch 4 taken 216 (fallthrough)

branch 5 taken 15

216: 344-block 3 branch 6 taken 114 (fallthrough)

branch 7 taken 102

114: 344-block 4 unconditional 8 taken 114

-: 345:    ((symbolic==BIT_MASK) && (protocol & UICC_T1_PROTOCOL_BIT))))

-: 346: {

107: 347:   return(TRUE);

107: 347-block 0 unconditional 0 taken 107

$$$$$: 701-block 2 unconditional 3 never executed

;;;188 status =
UtaOsSemCreate(&UICC_interface_sem,UICC_INTERFACE_TAG, 1,
　　　　　　　　UTA_OS_SEM_NORMAL);

;;;190 if(status == UTA_SUCCESS)

;;;191 {

;;;192 interface_semaphore_created = TRUE;

;;;193 return(TRUE);

;;;194 } else                                             802

```
;;;196 {

;;;202 interface_semaphore_created = FALSE;

;;;203 return(FALSE);

;;;204 }

000070 e3a00000 MOV  r0,#0;202

000074 e5c40001 STRB r0,[r4,#1];202 ;
interface_semaphore_created
```

000078 e8bd8010 POP  {r4,pc}

FIG. 8

METHOD FOR DETERMINING WHETHER A MACHINE CODE INSTRUCTION OF A MACHINE CODE PROGRAM IS EXECUTED IN THE MACHINE CODE PROGRAM

TECHNICAL FIELD

Various aspects relate to a method for determining whether a machine code instruction of a machine code program is executed in the machine code program.

BACKGROUND

A software program may be tested prior to release of a product (e.g. a software product and/or a hardware device) that may execute the software program. Code coverage may measure a degree to which the source code of the software program has been tested. For example, a code coverage tool may generate a report that may indicate which parts of the source code were executed during a testing of the software program. This information may be used for determining which portions of the software program may not have been executed. If a product is released with some parts of the software program that were never executed during testing, there may be a likelihood that the software program may fail due to software bugs that may exist in the untested parts of the software program.

Code coverage may be determined using host-based methods, which may simulate a hardware abstraction layer. In other words, code coverage may be determined using a tool (e.g. GCov, BullsEye, etc.) that may simulate a model of a target hardware peripheral device so that the source code of a software program may be executed on a host machine without using a hardware device (e.g. a hardware reference board). The source code of the software program may include target-dependent code, which may be tested using the simulated hardware abstraction layer.

Whilst a host-based method for determining code coverage may provide a convenience of testing a source code of a software program without a need of a hardware device, the code coverage determined from such a method may depend on how well the hardware abstraction layer is simulated. For example, as described above, the source code of the software program may include target-dependent code, and testing of the target-dependent code may depend on how well the hardware abstraction layer is simulated.

Furthermore, a host-based method for determining code coverage may not provide an accurate indication of how the source code of the software program may actually be executed in a hardware device. In other words, the real coverage of the source code in the hardware device may not be known.

New ways of determining code coverage of a source code of a software program may be needed.

SUMMARY

A method for determining whether a machine code instruction of a machine code program is executed in the machine code program is provided, which may include: replacing at least a part of a first machine code instruction of a plurality of first machine code instructions with a second machine code instruction, the second machine code instruction configured to generate a code exception; executing the machine code program including the second machine code instruction; and determining whether the second machine code instruction is executed based on the code exception.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which:

FIG. 5A to FIG. 5D show various examples of machine code programs.

FIG. 6A shows a machine code program that may be used to check a flow control in a DMA (Direct Memory Access) configuration.

FIG. 6B shows a report that may be generated in case a software program performing an identical function as the machine code program in FIG. 6A is tested by a host-based method for determining code coverage.

FIG. 7A shows a machine code program that may include a plurality of conditional instructions.

FIG. 7B shows a report that may be generated in case a software program performing an identical function as the machine code program in FIG. 7A is tested by a host-based method for determining code coverage.

FIG. 8 shows a software program that may test an OS (Operating System) functionality.

DESCRIPTION

The following detailed description refers to the accompanying drawings that show, by way of illustration, specific details and aspects in which the invention may be practised. These aspects are described in sufficient detail to enable those skilled in the art to practice the invention. Other aspects may be utilized and structural, logical, and electrical changes may be made without departing from the scope of the invention. The various aspects are not necessarily mutually exclusive, as some aspects can be combined with one or more other aspects to form new aspects. Various aspects are described for structures or devices, and various aspects are described for methods. It may be understood that one or more (e.g. all) aspects described in connection with structures or devices may be equally applicable to the methods, and vice versa.

The word "exemplary" is used herein to mean "serving as an example, instance, or illustration". Any aspect or design described herein as "exemplary" is not necessarily to be construed as preferred or advantageous over other aspects or designs.

Code coverage may be a measure of which parts of a source code of a software program are executed when the software program is tested. In other words, code coverage may measure the degree to which a source code of a software program has been tested.

Code coverage may be used by code developers to uncover latent bugs that may exist in the source code of the software program. For example, after a execution of the software program, a code coverage tool may report which parts of the source code of the software program were executed. This information may be used for determining which parts of the source code of the software program have not been run. Intuitively, a higher the code coverage, the greater the likelihood that any errors in the software program may be detected during a testing of the software program. Code coverage may be used by code developers to determine which portions of newly written source code are being executed and which logical paths are being taken in the software program. This may help reduce the length of a software program development cycle. Code coverage may be used by code developers to uncover dead code that may no longer be needed (e.g. probably belonging to an earlier version). This may allow code developers keep the source code size minimal leading to easier management and less source code clutter.

Figure 1:
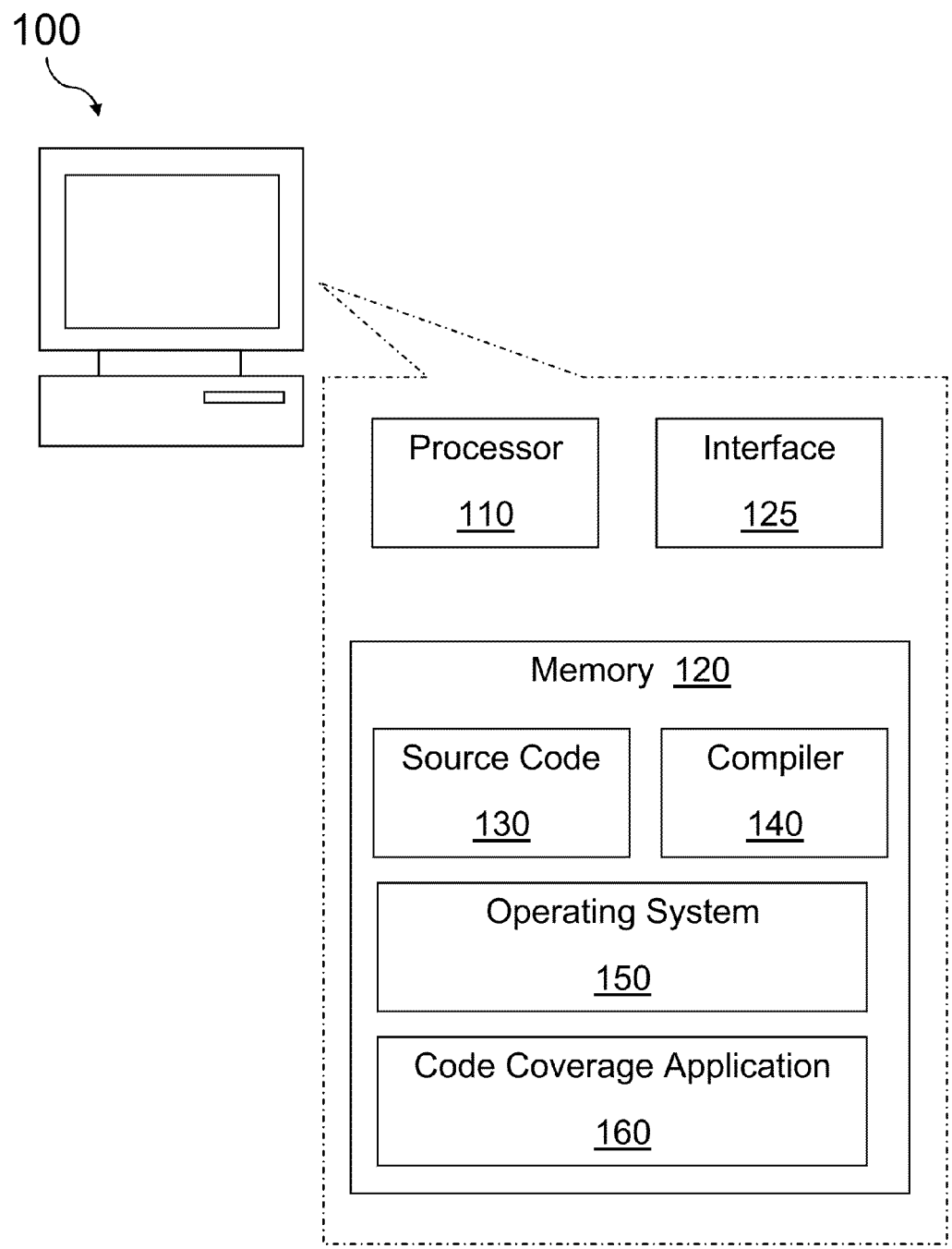
FIG. 1 shows a computer that may be used to determine code coverage.

FIG. 1 shows a computer 100 that may be used to determine code coverage.

The computer 100 may include a PC, a workstation, a laptop, a PDA, a palm device, and servers, although other devices for computing may be possible.

The computer 100 may include a processor 110, memory 120, and an interface 125.

At least one hardware device (e.g. a hardware device) (not shown in FIG. 1) may be communicatively coupled to the interface 125. The interface 125 may include, or may be, one or more buses and/or other wired or wireless connections. The interface 125 may have additional elements, such as controllers, buffers (caches), drivers, repeaters, and receivers, to enable communications. The interface 125 may include address, control, and/or data connections to enable appropriate communications among the above-identified additional elements.

When the computer 100 is in operation, the processor 110 may be configured to execute software stored within the memory 120 and/or to communicate data to and from the memory 120 and/or to control operations of the computer 100 pursuant to a program that may be executed. The code coverage application 160 and an OS (Operating System) 150 may be read, in whole or in part, by the processor 110, may be buffered within the processor 110, and may then be executed.

The processor 110 may include, or may be, a device for executing a program that may be stored in memory 120. The processor 110 may include, or may be, at least one of a custom made or commercially available processor, a central processing unit (CPU), a digital signal processor (DSP), and an auxiliary processor among several processors included in the computer 100.

The processor 110 may include, or may be, a microprocessor (e.g. a microchip) or a microprocessor. For example, the processor 110 may include, or may be, an 80*86 or Pentium series microprocessor from Intel Corporation, U.S.A., a PowerPC microprocessor from IBM, U.S.A., a Sparc microprocessor from Sun Microsystems Inc., a PA-RISC series microprocessor from Hewlett-Packard Company, U.S.A., and a 68xxx series microprocessor from Motorola Corporation, U.S.A, although other processors may be possible as well.

The memory 120 may include a plurality of caches and other types of storage devices. The memory 120 may include any one of or any combination of a volatile memory element (e.g. random access memory (RAM), such as dynamic random access memory (DRAM), a static random access memory (SRAM), etc.) and a non-volatile memory element (e.g. read only memory (ROM), such as erasable programmable read only memory (EPROM), electronically erasable programmable read only memory (EEPROM), etc.). The memory 120 may include electronic, magnetic, optical, and/or other types of storage media. The memory 120 may have a distributed architecture, where various components are situated remote from one another, but may be accessed by the processor 110.

The memory 120 may include a program, which may include may include one or more separate programs, each of which may include at least one executable instruction, e.g. for implementing logical functions. In the example shown in FIG. 1, the program included in the memory 120 may include an operating system (OS) 150, a compiler 140, a source code 130, and a code coverage application 160 (e.g. of the methods described herein). In other words, the code coverage application 160 may include functional components for implementing the features and operations of the methods described herein.

The operating system 150 (e.g. UNIX, Macintosh, LINUX, Windows, etc.) may control an execution of computer programs, and may provide scheduling, input-output control, file and data management, memory management, and communication control and related services.

The code coverage application 160 may be a source program, a machine code program or any other program including a set of at least one instruction to be performed or executed. As used herein, a source program may include, or may be, a program configured according to a high-level programming language (e.g. C, C++). As used herein, a machine code program may include, or may be, a code that may be generated from a high-level programming language (e.g. C, C++), for example, by means of the compiler 140. For example, a machine code program may include, or may be, a low-level programming language (e.g. an object code, an assembly (ASM) code, a register transfer language (RTL) code, etc.) that may be generated from a high-level programming language (e.g. by means of the compiler 140). Additionally or alternatively, a machine code program may include, or may be, a code written directly in a low-level programming language (e.g. in ASM). In an example where the code coverage application 160 may be a source program, the program may be translated via the compiler 140 so as to operate properly in connection with the OS 150.

The code coverage application 160 may be implemented in software, as is shown in FIG. 1. The code coverage application 160 may be stored on a computer readable medium for use by or in connection with any computer related system or method. A computer readable medium may include, or may be, an electronic, magnetic, optical, or other physical device or means that can contain or store a computer program for use by or in connection with a computer related system or method.

The code coverage application 160 may be implemented in a hardware device. For example, the code coverage application 160 may be implemented with any one of or any combination of: a discrete logic circuit having logic gates for implementing logic functions, an application specific integrated circuit (ASIC) having appropriate combinational logic gates, a programmable gate array(s) (PGA), a field programmable gate array (FPGA), etc.

Code coverage may be determined using host-based methods, which may simulate a hardware abstraction layer. For example, code coverage may be determined by implementing the code coverage application 160 in software, without having to implement the code coverage application 160 in a hardware device. In other words, code coverage may be determined using a tool (e.g. GCov, BullsEye, etc.) that may simulate a model of a hardware device so that the source code 130 of a software program may be executed on a host machine without having to use the hardware device (e.g. a hardware reference board). The source code 130 of the software program may include target-dependent code, which may be tested using the simulated hardware abstraction layer.

Whilst a host-based method for determining code coverage may provide a convenience of testing a source code 130 of a software program without a need of a hardware device, the code coverage determined from such a method may depend on how well the hardware abstraction layer is simulated. For example, as described above, the source code 130 of the software program may include target-dependent code, and testing of the target-dependent code may depend on how well the hardware abstraction layer is simulated.

Consequently, a host-based method for determining code coverage may not provide an accurate indication of how the source code 130 of the software program may actually be executed in a hardware device. In other words, the real coverage of the source code 130 in the hardware device may not be known.

For example, simulation of the hardware abstraction layer may require simulating an ISR (Interrupt Service Routine) of the hardware device being simulated. The simulation of an ISR of the hardware device may be complicated, and may not accurately model the ISR of the actual hardware device.

By way of another example, a shared bug in the simulated hardware abstraction layer and the software program under test may lead to an indication that the source code 130 of the software program is executed, when in fact, it may not be in the actual hardware device.

By way of another example, a host-based method for determining code coverage may be applied to a high-level programming language (e.g. C, C++) in the host environment. Accordingly, the source code 130 of the software program being tested may not actually be the source code 130 that may be run in the hardware device that may ultimately execute the software program.

By way of yet another example, a hardware device that may ultimately execute the software program may have a faulty voltage driver and/or a faulty kernel clock and/or a faulty ICU (Input Capture Unit) driver. These faults may, for example, adversely affect code coverage. In a host-based method for determining code coverage, the adverse effect these factors have on the code coverage may not be reflected. For example, an access to an unpowered hardware device due to a change in a power driver may not be reflected in a host-based method for determining code coverage.

A host-based method for determining code coverage may not provide accurate information regarding which parts of the source code 130 of the software program are executed or not. For example, a host-based method for determining code coverage may merely indicate whether a line of a source code 130 of a software program is entered. In such an example, there may not be information regarding whether an instruction included in the line of the source code 130 is executed or not. For example, a host-based method may indicate that a software program flow may branch into a line of the source code 130. However, a host-based method may not provide an indication of whether an instruction of the line is executed or not. In other words, a host-based method may only indicate that a line of the source code 130 is branched into, and may not indicate whether an instruction of the line is executed successfully or not. For example, a non-execution of an "else" instruction and/or of a default instruction may not be indicated in a host-based method for determining code coverage.

A host-based method for determining code coverage may not provide a possibility of validating low-level hardware access during testing of the source code 130 of the software program. For example, the simulated hardware abstraction layer may not include hardware related voltage and/or clock functionalities. Accordingly, such low-level hardware accesses during an execution of the source code 130 of the software program may not be tested in a host-based method for determining code coverage.

In like manner, a host-based method for determining code coverage may not provide a possibility of validating RTOS (Real Time Operating System) functionalities during testing of the source code 130 of the software program. For example, the simulated hardware abstraction layer may not include semaphore, task, and timer functionalities. Accordingly, RTOS functionalities during an execution of the source code 130 of the software program may not be tested in a host-based method for determining code coverage.

In view of the above-mentioned features of a host-based method for determining code coverage, the following needs may be identified:

There may be a need to test a program in a hardware device, without having to depend on a simulation of a hardware abstraction layer.

There may be a need to test a program in a hardware device, without having to simulate an ISR of a hardware device.

There may be a need to test a program in a programming language that may be directly executed by a hardware device.

There may be a need to provide an indication of whether an instruction of a program (and not just a line of the program) is executed or not.

There may be a need to provide a possibility of validating low-level hardware access during a testing of a program. For example, there may be a need to provide a possibility of validating hardware related voltage and/or clock functionalities during a testing of a program.

There may be a need to provide a possibility of validating RTOS (Real Time Operating System) functionalities during a testing of a program. For example, there may be a need to provide a possibility of validating semaphore, task, and timer functionalities during a testing of a program.

Figure 2:
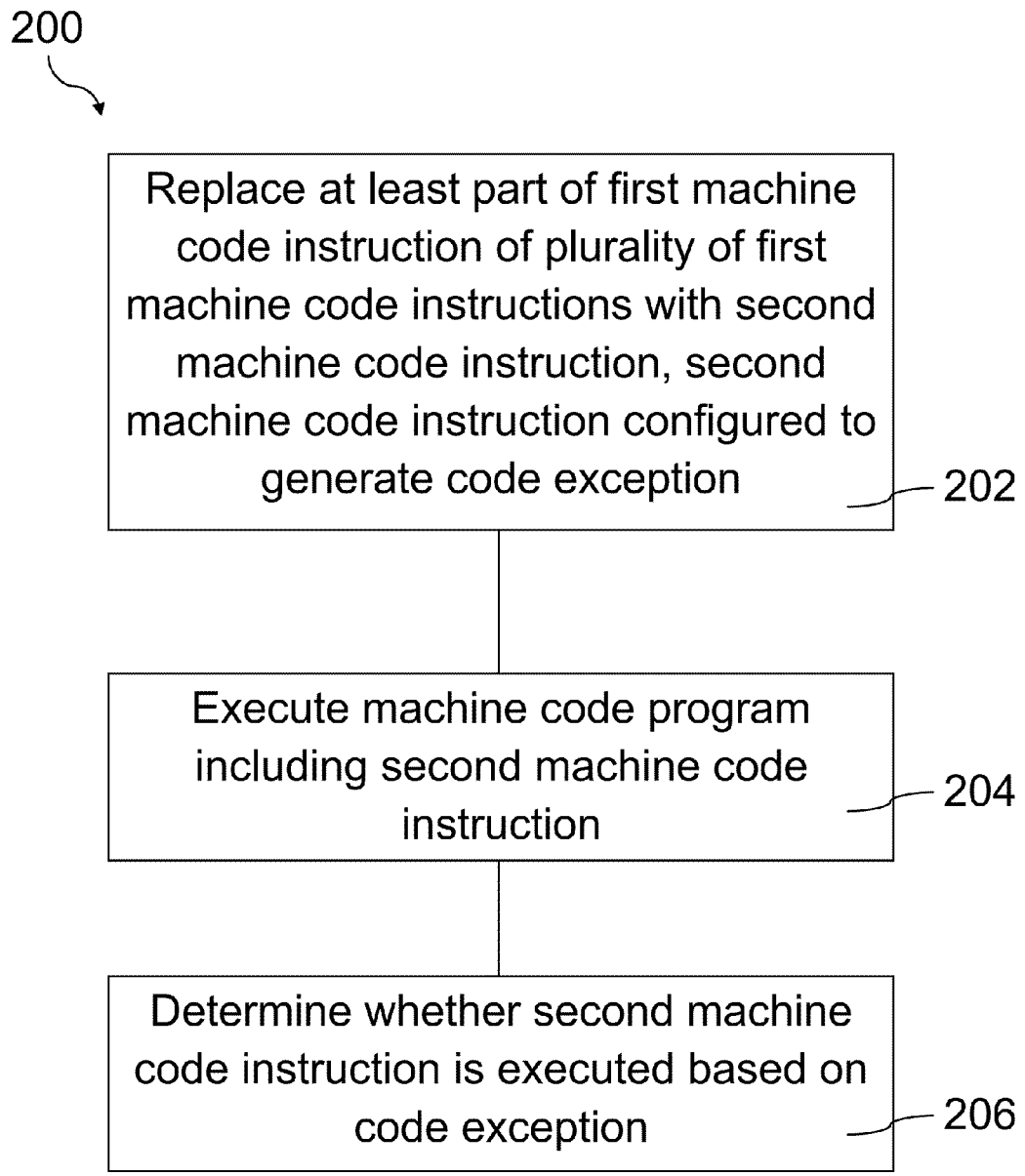
FIG. 2 shows a method for determining whether a machine code instruction of a machine code program is executed in the machine code program.

The above-described needs may, for example, be satisfied by the method shown in FIG. 2.

FIG. 2 shows a method 200 for determining whether a machine code instruction of a machine code program is executed in the machine code program.

The method 200 may include: replacing at least a part of a first machine code instruction of a plurality of first machine code instructions with a second machine code instruction, the second machine code instruction configured to generate a code exception (in 202); executing the machine code program including the second machine code instruction (in 204); and determining whether the second machine code instruction is executed based on the code exception (in 206).

The second machine code instruction may be determined as executed (e.g. determined to have been executed) in case the code exception is generated. Conversely, the second machine code instruction may be determined as not executed (e.g. determined to not have been executed) in case no code exception is generated.

The method 200 may, for example, be implemented in the computer 100 shown in FIG. 1 with, for example, a hardware device connected to the interface 125.

The method 200 may, for example, be referred to as a target-based method for determining code coverage.

Figure 3:
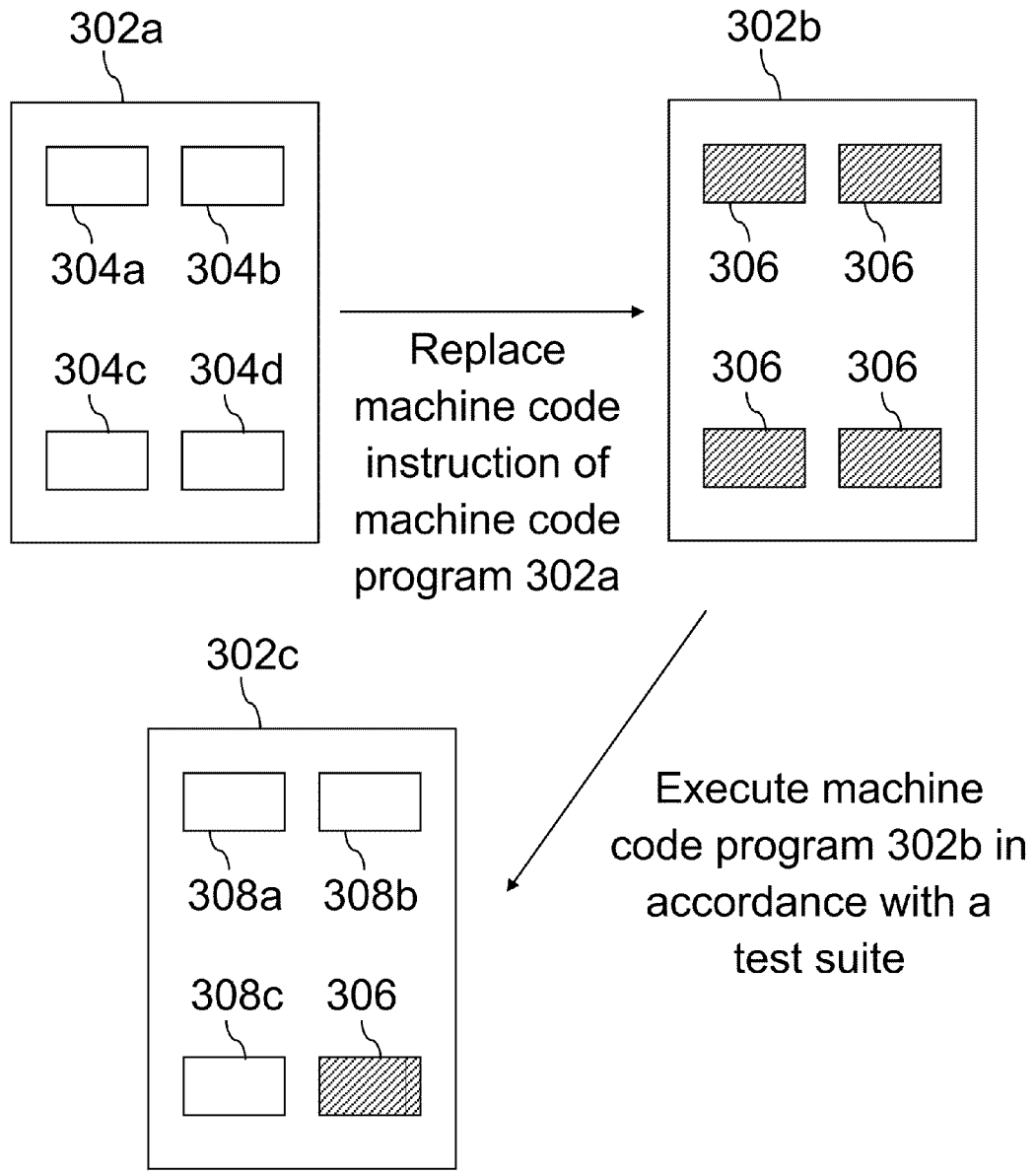
FIG. 3 shows a general illustration of the method shown in FIG. 2.

FIG. 3 shows a general illustration of the method 200 shown in FIG. 2.

FIG. 3 shows a machine code program 302a including a plurality of first machine code instructions 304a, 304b, 304c, 304d. Only four first machine code instructions 304a, 304b, 304c, and 304d are shown as an example, however the number of first machine code instructions may be greater than four, and may, for example, be five, six, seven, eight, nine, tens, hundreds or thousands of first machine code instructions. The machine code program 302a may include, or may be, a code that may be generated from a high-level programming language (e.g. C, C++), for example, by means of a compiler. For example, the machine code program 302a may include, or may be, a low-level programming language (e.g. an object code, an assembly (ASM) code, a register transfer language (RTL) code, etc.) that may be generated from a high-level programming language (e.g. by means of a compiler). Additionally or alternatively, the machine code program 302a may include, or may be, a code written directly in a low-level programming language (e.g. in ASM).

The plurality of first machine code instructions 304a, 304b, 304c, 304d of the machine code program 302a may, for example, be configured according to low-level programming language. For example, the plurality of first machine code instructions 304a, 304b, 304c, 304d of the machine code program 302a may, for example, be configured according to an assembly language.

The plurality of first machine code instructions 304a, 304b, 304c, 304d may, for example, include, or may be, an instruction according to the RVCT (Real View Compilation Tools).

The plurality of first machine code instructions 304a, 304b, 304c, 304d may, for example, include, or may be, an instruction configured according to an ARM (Advanced RISC (Reduced Instruction Set Computing) Machines) code. In other words, the plurality of first machine code instructions 304a, 304b, 304c, 304d may include, or may be, an instruction of an ARM instruction set. For example, the plurality of first machine code instructions 304a, 304b, 304c, 304d may include, or may be, a machine code instruction for execution in hardware device designed according to an ARM architecture.

As described above in relation to FIG. 2, at least a part of a first machine code instruction of the plurality of first machine code instructions may be replaced with a second machine code instruction (e.g. in 202). This is illustrated in FIG. 3 where at least one first machine code instruction of the plurality of first machine code instructions 304a, 304b, 304c, 304d (e.g. all first machine code instructions) may be replaced with a second machine code instruction 306.

As described above in relation to FIG. 2, the second machine code instruction 306 may be configured to generate a code exception (e.g. in 202). The code exception may, for example, be generated upon execution of the second machine code instruction 306. For example, the second machine code instruction 306 may include, or may be, an undefined instruction that may be configured to generate the code exception (e.g. upon execution of the undefined instruction). The undefined instruction may be configured according to a machine language. For example, the undefined instruction may include, or may be, an instruction from the ARM instruction set. For example, the undefined instruction may include, or may be, an ARM undefined (UNDEF) instruction.

A test suite may, for example, be configured to execute the machine code program 302a and/or the machine code program 302b, e.g. for testing the machine code program 302a and/or the machine code program 302b. In other words, the test suite may be used to execute the machine code program 302a and/or the machine code program 302b, for example, in a hardware device. For example, the test suite may be configured to execute at least one first machine code instruction of the machine code program 302a and/or at least one second machine code instruction of the machine code program 302b, for example, in a hardware device. As shown in FIG. 3, the test suite may be run on the machine code program 302b, and the second machine code instructions 306 of the machine code program 302b may be executed in accordance with the test suite.

As described above, the test suite may be configured to execute at least one second machine code instruction of the machine code program 302b, for example, in a hardware device. Since the test suite may be run on the machine code program 302b including the second machine code instructions 306, the test suite may, for example, execute at least one of the second machine code instructions 306 (e.g. ARM UNDEF instruction) which may have replaced the first machine code instructions 304a, 304b, 304c, 304d.

In the example shown in FIG. 3, the test suite may execute the second machine code instructions 306 (e.g. ARM UNDEF instructions) of the machine code program 302b that may have replaced the first machine code instructions 304a, 304b, and 304c. Accordingly, the executed second machine code instructions 306 (e.g. ARM UNDEF instructions) in place of the first machine code instructions 304a, 304b, and 304c may generate code exceptions 308a, 308b, and 308c, respectively.

In the example shown in FIG. 3, the test suite may not execute the second machine code instruction 306 (e.g. ARM UNDEF instruction) of the machine code program 302b that may have replaced the first machine code instructions 304d. Accordingly, the second machine code instruction 306 (e.g. ARM UNDEF instruction) in place of the first machine code instruction 304d may not generate a code exception. In other words, the second machine code instruction 306 (e.g. ARM UNDEF instruction) in place of the first machine code instruction 304d may remain unperturbed in the machine code program 302c, as shown in FIG. 3.

As described above in relation to FIG. 2, the method 200 may include determining whether the second machine code instruction is executed based on the code exception (e.g. in 206). In the example shown in FIG. 3, the code exception 308a of the machine code program 302c may be used to determine that the second machine code instruction 306 of the machine code program 302b in place of the first machine code instruction 304a is executed (e.g. by the test suite). In like manner, the code exceptions 308b and 308c of the machine code program 302c may be used to determine that the second machine code instructions 306 of the machine code program 302b in place of the first machine code instructions 304b and 304c, respectively, are executed (e.g. by the test suite).

Conversely, a code exception may not be generated by the second machine code instruction 306 in place of the first machine code instruction 304d (e.g. since it is not executed by the test suite). In such an example, the second machine code instruction 306 of the machine code program 302c in place of the first machine code instruction 304d may be determined as not executed (e.g. by the test suite) since no code exception is generated by it.

As described above, the test suite may, for example, be configured to execute the machine code program 302b and/or the machine code program 302a, for example, in a hardware device. In the example shown in FIG. 3, the test suite may be run on the machine code program 302b including the second machine code instructions 306. However, the test suite may also be used to execute the machine code program 302a including the plurality of first machine code instructions 304a, 304b, 304c, 304d. In such an example, the code exceptions 308a, 308b, and 308c of the machine code program 302c may be used to determine whether the first machine code instructions 304a, 304b, 304c, 304d of the machine code program 302a would be executed had the test suite been executed on the machine code program 302a. In other words, a determination about whether the first machine code instructions 304a, 304b, 304c, 304d is executed in the machine code program 302a (e.g. according to the test suite) may be made based on the code exceptions 308a, 308b, and 308c of the machine code program 302c.

In the example shown in FIG. 3, it may be determined (e.g. inferred by a comparison of machine code program 302a and machine code program 302c) that the first machine code instruction 304a would be executed in the machine code program 302a had the test suite been run on the machine code program 302a. In like manner, it may be determined (e.g. inferred by a comparison of machine code program 302a and machine code program 302c) that the first machine code instructions 304b and 304c would be executed in the machine code program 302a had the test suite been run on the machine code program 302a. In other words, the first machine code instructions 304a, 304b, and 304c may be determined as executed in the machine code program 302a (e.g. according to the test suite) when processing the machine code program 302c in case a code exception is generated. Conversely, it may be determined that the first machine code instruction 304d would not be executed in the machine code program 302a had the test suite been run on the machine code program 302a. In other words, the first machine code instruction 304d may be determined as not executed in the machine code program 302a (e.g. according to the test suite) when processing the machine code program 302c in case no code exception is generated.

Consequently, it may be observed from the example shown in FIG. 3 that the second machine code instruction 306 (e.g. ARM UNDEF instruction) of the machine code program 302b may be exploited to give a clear indication of which second machine code instruction 306 (e.g. ARM UNDEF instruction) may be executed (e.g. in a hardware device) and which second machine code instruction 306 (e.g. ARM UNDEF instruction) may not be executed (e.g. in a hardware device).

It may also be observed from the example shown in FIG. 3 that the second machine code instruction 306 (e.g. ARM UNDEF instruction) of the machine code program 302b may be exploited to determine whether a first machine code instruction of the machine code program 302a is executed or not (e.g. according to a test suite, for example, in a hardware device). For example, the second machine code instruction 306 (e.g. ARM UNDEF instruction) of the machine code program 302b may be exploited to give a clear indication of which first machine code instruction of the machine code program 302a may be executed (e.g. in a hardware device) and which first machine code instruction of the machine code program 302a may not be executed (e.g. in a hardware device).

With an indication of which first machine code instruction of the machine code program 302 may not be executed (e.g. in a hardware device), another test suite may be designed (e.g. written) to specifically test an execution of the unexecuted first machine code instruction. This may, consequently, improve a measurement of the amount of code of the machine code program that may be executed when the machine code program is executed, for example, in a hardware device.

In light of the above-described features of the method 200, the following effects may be identified:

An effect provided by the method 200 may be that a machine code program may be executed in a hardware device, without having to depend on a simulation of a hardware abstraction layer.

An effect provided by the method 200 may be that a machine code program may be executed in a hardware device, without having to simulate an ISR of the hardware device.

An effect provided by the method 200 may be that a machine code program may be executed in a programming language that may be directly executed by a hardware device.

An effect provided by the method 200 may be provision of an indication of whether an instruction of a machine code program (and not just a line of the machine code program) is executed or not.

An effect provided by the method 200 may be provision of a possibility of validating low-level hardware access during an execution of a machine code program. For example, hardware related voltage and/or clock functionalities may be validated during an execution of the machine code program.

An effect provided by the method 200 may be provision of a possibility of validating RTOS (Real Time Operating System) functionalities during an execution of a machine code program. For example, semaphore, task, and timer functionalities may be validated during an execution of a machine code program.

Figure 4:
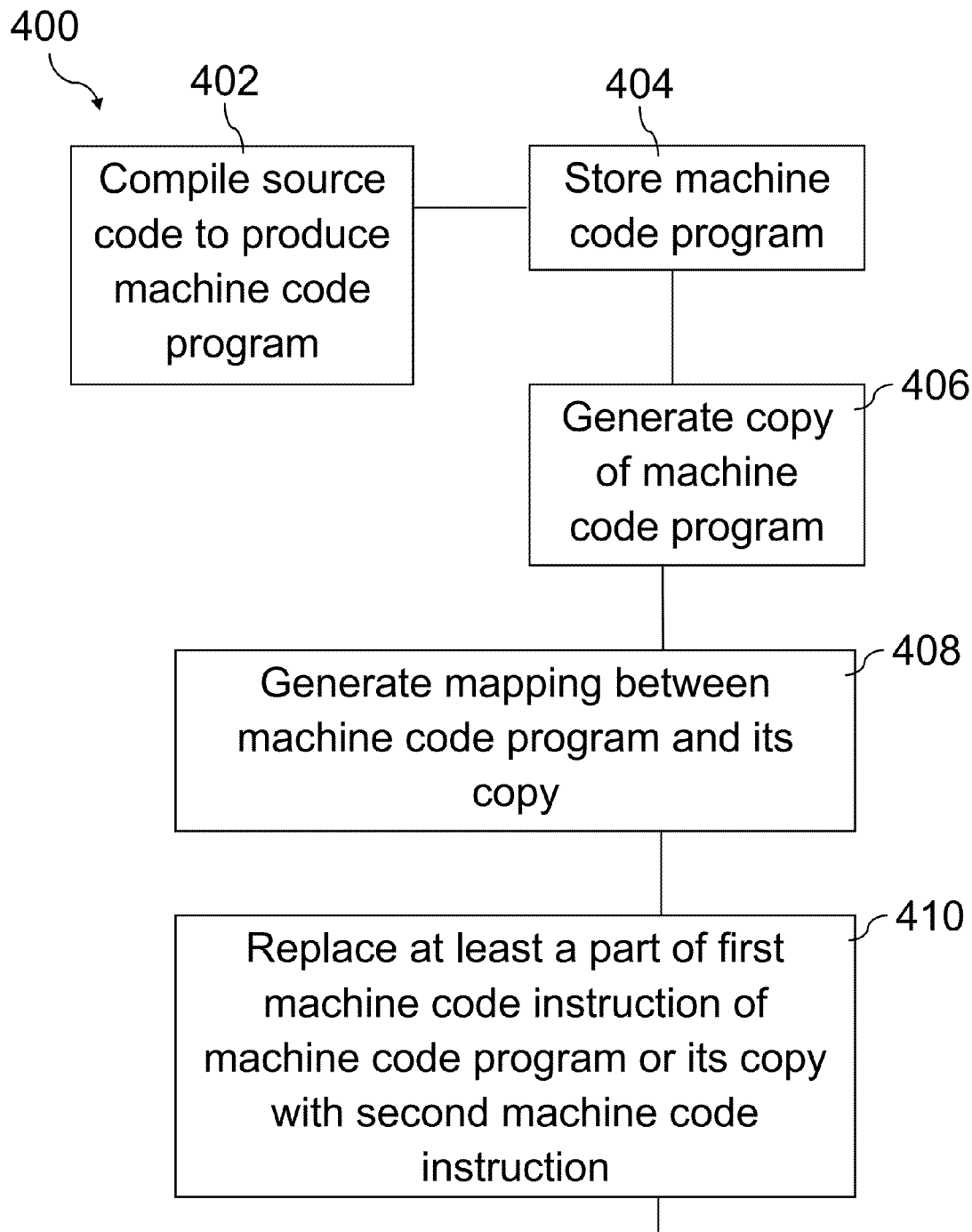
FIG. 4 shows a flow diagram illustrating a method for determining whether a machine code instruction of a machine code program is executed in the machine code program.
Figure 4:
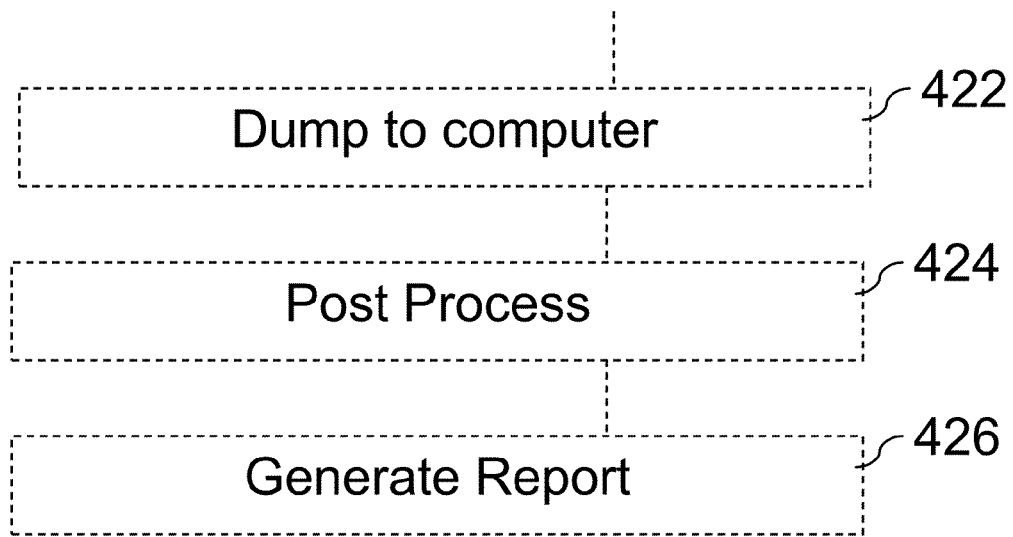

FIG. 4 shows a flow diagram 400 illustrating a method for determining whether a machine code instruction of a machine code program is executed in the machine code program.

FIG. 4 may, for example, be an implementation of the method 200 shown in FIG. 2. Accordingly, the various effects described above in relation to the method 200 shown in FIG. 2 may be analogously valid for the method 400 shown in FIG. 4.

The method 400 may include compiling a source code (in 402). The source code may include, or may be, a software code written in a high-level programming language, which may have routines, subroutines, and/or functions, such as, for example, C, C++, C#, Pascal, BASIC, API calls, HTML, XHTML, XML, ASP scripts, FORTRAN, COBOL, Perl, Java, ADA, and .NET, although other high-level programming languages may be possible as well.

The source code (e.g. C++ code) may be compiled, for example, in machine code mode, to produce a machine code program. For example, the source code (e.g. C++ code) may be compiled in ARM mode (e.g. by an ARM compiler). In such an example, the compilation of the source code (in 402) may produce a machine code program configured according to an ARM machine code language.

The compilation of the source code (in 402) may produce a machine code program including a plurality of first machine code instructions (e.g. ARM code instructions).

Figure 5A:

FIG. 5A shows a machine code program 502 including a plurality of first machine code instructions 502-1, 502-2, 502-3, 502-4, 502-5, 502-6, 502-7, 502-8 that may, for example, be produced by compiling a source code (e.g. C++ code).

The machine code program 502 shown in FIG. 5A may, for example, be identified with the machine code program 302a including the first machine code instructions 304a, 304b, 304c, 304d shown in FIG. 3.

The machine code program 502 may, for example, include, or may be, a machine code program that may be executed in a hardware device (e.g. at an end-user side). Accordingly, there may be a need to test the machine code program 502 (e.g. by executing it in the hardware device). For example, there may be a need to determine whether or not a first machine code instruction of the plurality of first machine code instructions 502-1, 502-2, 502-3, 502-4, 502-5, 502-6, 502-7, 502-8 is executed in the machine code program 502 (e.g. in a hardware device).

The method 400 may include storing the machine code program 502 (in 404), for example, in memory (e.g. in non-volatile memory, for example ROM (Read Only Memory)). For example, the machine code program 502 may be placed in a separate section in memory (e.g. in ROM). In other words, the method 400 may include storing the machine code program 502 including the plurality of first machine code instructions 502-1, 502-2, 502-3, 502-4, 502-5, 502-6, 502-7, 502-8 (e.g. in memory).

Figure 5B:

The method 400 may include generating a copy of the machine code program 502 (in 406). For example, FIG. 5B shows a copy 504 of the machine code program 502 (hereinafter referred to as "the copy 504") including the plurality of first machine code instructions 504-1, 504-2, 504-3, 504-4, 504-5, 504-6, 504-7, 504-8. The plurality of first machine code instructions 504-1, 504-2, 504-3, 504-4, 504-5, 504-6, 504-7, 504-8 may be a copy of the plurality of first machine code instructions 502-1, 502-2, 502-3, 502-4, 502-5, 502-6, 502-7, 502-8.

The copy 504 may, for example, be made during a system start-up. In other words, a backup of the machine code program 502 may be made during a system startup. The copy 504 may, for example, be stored in memory (e.g. in RAM (Random Access Memory), for example in a RAM buffer).

The method 400 may include generating a mapping between the machine code program 502 and the copy 504 (in 408).

The mapping between the machine code program 502 and the copy 504 may, for example, be stored in a table, for example, a table in a Memory Management Unit.

The mapping between the machine code program 502 and the copy 504 may, for example, include, or may be, a mapping between identical instructions of the machine code program 502 and the copy 504. For example, the first machine code instruction 502-1 of the machine code program 502 shown in FIG. 5A may be mapped to the first machine code instruction 504-1 of the copy 504 of the machine code program 502 shown in FIG. 5B. In like manner, the first machine code instruction 502-2 of the machine code program 502 shown in FIG. 5A may be mapped to the first machine code instruction 504-2 of the copy 504 of the machine code program 502 shown in FIG. 5B. A similar mapping between identical instructions of the machine code program 502 and the copy 504 may be made for first machine code instructions 502-3, 502-4, 502-5, 502-6, 502-7, 502-8 and first machine code instructions 504-3, 504-4, 504-5, 504-6, 504-7, 504-8.

The mapping between the machine code program 502 and the copy 504 may, for example, include, or may be, a mapping between an address of a machine code instruction of the machine code program 502 and an address of an identical machine code instruction of the copy 504. For example, the first machine code instruction 502-1 may be stored at a memory address M1-1, and the identical first machine code instruction 504-1 may be stored at a memory address M1C-1. A mapping between the machine code program 502 and the copy 504 may include, or may be, a mapping between the memory address M1-1 of the first machine code instruction 502-1 and the memory address M1C-1 of the first machine code instruction 504-1. By way of another example, the first machine code instruction 502-8 may be stored at a memory address M1-8, and the identical first machine code instruction 504-8 may be stored at a memory address M1C-8. A mapping between the machine code program 502 and the copy 504 may include, or may be, a mapping between the memory address M1-8 of the first machine code instruction 502-1 and the memory address M1C-8 of the first machine code instruction 504-1. A similar mapping between the memory addresses of identical instructions of the machine code program 502 and the copy 504 may be made for first machine code instructions 502-2, 502-3, 502-4, 502-5, 502-6, 502-7 and first machine code instructions 504-2, 504-3, 504-4, 504-5, 504-6, 504-7.

The method 400 may include replacing at least a part of a first machine code instruction of the machine code program 502 or the copy 504 with a second machine code instruction (in 410).

FIG. 5C shows an example of a machine code program 509 in which the first machine code instruction 502-1 and the first machine code instruction 502-8 of the machine code program 502 are replaced with the second machine code instructions (e.g. ARM UNDEF instruction) 506-1 and 506-8, respectively. In another example, the first machine code instruction 504-1 and the first machine code instruction 504-8 of the copy 504 may be replaced with the second machine code instructions (e.g. ARM UNDEF instruction) 506-1 and 506-8, respectively. The machine code program 509 shown in FIG. 5C may, for example, be identified with the machine code program 302b shown in FIG. 3. In the example shown in FIG. 5C, an operation code (opcode) or machine code equivalent for the second machine code instructions (e.g. ARM UNDEF instruction) 506-1 and 506-8 may, for example, be expressed as 0xe7f0e7f0. In other words, the second machine code instructions (e.g. ARM UNDEF instruction) 506-1 and 506-8 and its opcode or machine code equivalent 0xe7f0e7f0 may refer to the same logical entity.

As described above in relation to FIG. 3, the second machine code instruction 306 may be configured to generate a code exception (e.g. upon execution of the second machine code instruction 306). In like manner, the second machine code instructions (e.g. ARM UNDEF instruction) 506-1 and 506-8 shown in FIG. 5C may be configured to generate a code exception (e.g. upon execution of the second machine code instructions 506-1 and 506-8).

The code exception may, for example, trigger an execution of a exception handler that may, for example, be stored at an exception memory address.

As described above in relation to FIG. 5A, the first machine code instruction 502-1 of the machine code program 502 may be stored at the memory address M1-1. As shown in FIG. 5C, the first machine code instruction 502-1 of the machine code program 502 may be replaced by the second machine code instruction 506-1. Accordingly, the second machine code instruction 506-1 (e.g. ARM UNDEF instruction) may be stored at the memory address M1-1. In like manner, the second machine code instruction 506-8 (e.g. ARM UNDEF instruction) may be stored at the memory address M1-8 of the first machine code instruction 502-8 of the machine code program 502.

The first machine code instruction (e.g. first machine code instructions 502-1 and/or 502-8) may include a conditional field and an instruction field. The conditional field of the first machine code instruction (e.g. first machine code instructions 502-1 and/or 502-8) may, for example, indicate a condition that has to be satisfied in order for the instruction included in the instruction field to be executed. In other words, the instruction included in the instruction field of the first machine code instruction (e.g. first machine code instructions 502-1 and/or 502-8) may be executed in case the condition indicated in the conditional field is satisfied.

The instruction field of the first machine code instruction (e.g. first machine code instructions 502-1 and/or 502-8) may be replaced with the second machine code instruction (e.g. ARM UNDEF instruction) (e.g. second machine code instructions 506-1 and/or 506-8). In other words, the second machine code instructions 506-1 and 506-8 may be executed upon fulfillment of the same condition as the first machine code instructions 502-1 and 502-8, respectively. This may be done in order to avoid a situation in which the second machine code instructions 506-1 and 506-8 (e.g. ARM UNDEF instructions) may be executed irrespective of the conditional field.

The method 400 may include executing the machine code program 509 including the second machine code instruction (e.g. second machine code instructions 506-1 and 506-8) (in 412).

The machine code program 509 including the second machine code instruction (e.g. second machine code instructions 506-1 and 506-8) may, for example, be executed based on a test suite, which may be configured to execute the machine code program 502 and/or the machine code program 504 and/or the machine code program 509, e.g. for testing at least one of the aforementioned machine code programs.

Executing the machine code program 509 including the second machine code instruction (e.g. second machine code instructions 506-1 and/or 506-8) may, for example, include reinstating an original instruction in place of the second machine code instruction (e.g. second machine code instructions 506-1 and/or 506-8) and re-executing the original instruction and the first machine code instructions 502-2 to 502-7 included in the machine code program 509.

The machine code program 509 may include an exception instruction, for example, among the first machine code instructions 502-2 to 502-7 and/or the second machine code instructions 506-1 and 506-8 and/or other instructions of the machine code program 509. The exception instruction may generate a code exception. For example, there may be at least one instruction included in the machine code program 509 that may cause an execution error, which may in turn generate the code exception. This at least one instruction that may cause the execution error may be referred to as an exception instruction.

The second machine code instruction (e.g. second machine code instructions 506-1 and 506-8) may, for example, be a specific example of the above-described exception instruction.

The exception instruction that may generate the code exception may include, or may be, at least one of a reset instruction, an undefined instruction, a software interrupt instruction, a prefetch abort instruction, a data abort instruction, an interrupt request (IRQ) instruction and a fast interrupt request (FIQ) instruction. For example, the ARM instruction set may include at least one of (e.g. all of) the aforementioned exception instructions.

The exception instruction may, for example, be stored at a memory address. The memory address of each of the aforementioned exception instructions may be unique. In other words, the memory address of an exception instruction may be different from the memory address of another exception instruction. For example, the memory address of an FIQ instruction may be different from the memory address of a prefetch abort instruction.

As described above, the exception instruction may be configured to generate a code exception. When a code exception occurs, execution of the machine code program 509 may be forced from a memory address that may depend on the type of exception (e.g. whether the exception instruction is an FIQ, IRQ, prefetch abort, etc.). The memory address corresponding to each of the aforementioned exception instructions may be referred to as an exception vector. The exception vectors of each of the aforementioned exception instructions may be unique. In other words, the exception vector of an exception instruction may be different from the exception vector of another exception instruction. For example, the exception vector of an FIQ instruction may be different from the exception vector of a prefetch abort instruction, which may in turn be different from the exception vector of an IRQ instruction).

Each of the aforementioned exception instructions may, for example, have a corresponding exception handler. The exception handlers of each of the aforementioned exception instructions may unique. In other words, the exception handler corresponding to an exception instruction may be different from the exception handler corresponding to another exception instruction. For example, the exception handler corresponding to an FIQ instruction may be different from the exception handler corresponding to a prefetch abort instruction.

In light of the description presented above, the method 400 may include generating a code exception (in 414), for example, in case an exception instruction is executed in the machine code program 509.

As described above, the machine code program 509 may include an exception instruction, which may generate a code exception. The exception instruction may for example, be located among the first machine code instructions 502-2 to 502-7 and/or the second machine code instructions 506-1 and 506-8 and/or other instructions of the machine code program 509. In case a code exception is generated, a determination may be made in order to ascertain whether the code exception was generated due to an execution of the second machine code instruction 506-1 and/or 506-8 (e.g. ARM UNDEF instructions) or whether the code exception was generated due to an execution of an exception instruction other than the second machine code instruction 506-1 and/or 506-8 (e.g. ARM UNDEF instructions). In order to determine whether the code exception was generated due to an execution of the second machine code instruction 506-1 and/or 506-8 (e.g. ARM UNDEF instructions), the second machine code instruction (e.g. second machine code instructions 506-1 and/or 506-8) may be compared with the exception instruction that generated the code exception. For example, the opcode or machine code equivalent of the second machine code instruction (e.g. second machine code instructions 506-1 and/or 506-8), e.g. 0xe7f0e7f0 shown in FIG. 5C, may be compared with the opcode or machine code equivalent of the exception instruction that generated the code exception. In case the second machine code instruction (e.g. opcode or machine code equivalent of the second machine code instruction, e.g. 0xe7f0e7f0 shown in FIG. 5C) is identical to the exception instruction (e.g. opcode or machine code equivalent of the exception instruction) that generated the code exception, it may be determined that the second machine code instruction (e.g. second machine code instructions 506-1 and/or 506-8) was executed. On the other hand, in case the second machine code instruction (e.g. opcode or machine code equivalent of the second machine code instruction, e.g. 0xe7f0e7f0 shown in FIG. 5C) is not identical to the exception instruction (e.g. opcode or machine code equivalent of the exception instruction) that generated the code exception, it may be determined that the second machine code instruction (e.g. second machine code instructions 506-1 and/or 506-8) was not executed.

Accordingly, determining whether the second machine code instruction (e.g. second machine code instructions 506-1 and 506-8) is executed based on the code exception may include comparing a second machine code instruction (e.g. an opcode or machine code equivalent for the second machine code instructions 506-1 and 506-8, e.g. 0xe7f0e7f0 shown in FIG. 5C) with the exception instruction that generated the code exception. This is shown as box 416 in method 400.

In case it is determined that the second machine code instruction (e.g. second machine code instructions 506-1 and 506-8) is executed (e.g. in case the opcode or machine code equivalent of the second machine code instruction is identical to the opcode or machine code equivalent of the exception instruction that generated the code exception), the exception handler corresponding to the second machine code instruction (e.g. second machine code instructions 506-1 and 506-8) may be called and may be subsequently executed.

The exception handler corresponding to the second machine code instruction (e.g. second machine code instructions 506-1 and/or 506-8) which was executed may, for example, be configured to compare the memory address of the executed second machine code instruction with a memory address of a first machine code instruction, which may be mapped to the memory address of the executed second machine code instruction. This comparison may be done in order to replace the second machine code instruction which was executed with an original machine code instruction (e.g. with the first machine code instruction that was replaced by the second machine code instruction). For example, as described above in relation to FIG. 5C, the second machine code instructions 506-1 and 506-8, each having an opcode or machine code equivalent 0xe7f0e7f0, may be stored at the memory addresses M1-1 and M1-8, respectively. Furthermore, as described above in relation to FIG. 5B, the memory address M1-1 may be mapped to the memory address M1C-1 of the first machine code instruction 504-1, and the memory address M1-8 may be mapped to the memory address M1C-8 of the first machine code instruction 504-8. Accordingly, in case the second machine code instruction 506-1 was executed, the exception handler corresponding to the second machine code instruction 506-1 may, for example, be configured to compare the memory address M1-1 with the memory address M1C-1. As described above, this comparison may be made in order to reinstate the at least part of the first machine code instruction replaced by the second machine code instruction, in case the second machine code instruction is determined to be executed. In other words, the method 400 may include reinstating the part of the first machine code instruction replaced by the second machine code instruction (in 418).

FIG. 5D shows an example of a machine code program 511 in which the part of the first machine code instruction 502-1 replaced with the second machine code instruction (e.g. ARM UNDEF instruction) 506-1 is reinstated. As described above, there may be a mapping between the machine code program 509 with copy 504. For example, the memory address M1C-1 of the first machine code instruction 504-1 of the copy 504 may be mapped to the memory address M1-1 of the second machine code instruction 506-1 that may replace the first machine code instruction 502-1. The mapping may, for example, be used for reinstating the part of the first machine code instruction replaced with the second machine code instruction (e.g. ARM UNDEF instruction) 506-1. For example, the first machine code instruction 504-1 (which may be identical to the first machine code instruction 502-1) may be obtained from the copy 504. The first machine code instruction 504-1 may replace the second machine code instruction (e.g. ARM UNDEF instruction) 506-1, thus reinstating the part of the first machine code instruction replaced with the second machine code instruction (e.g. ARM UNDEF instruction) 506-1.

The exception handler corresponding to the second machine code instruction (e.g. second machine code instruction 506-1) may, for example, be configured to update a link register (e.g. R14_abt), which may, for example, store a memory address to return to when an execution of the exception handler is completed. In the example shown in FIG. 5C, the link register may store the memory address M1-1 of the second machine code instruction 506-1. Since the part of the first machine code instruction previously replaced with the second machine code instruction (e.g. ARM UNDEF instruction) 506-1 may be reinstated (e.g. as shown in FIG. 5D), the link register may be updated to, for example, store the memory address M1-2 of the first machine code instruction 504-2 of the machine code program 511.

The exception handler corresponding to the second machine code instruction (e.g. second machine code instruction 506-1) may, for example, be configured to restore a PSR (Program Status Register) and/or the PC (Program Counter) in order to exit the code exception.

Upon exit of the code exception, an instruction pointer may be returned to the memory address stored in the link register.

The reinstated first machine code instruction 504-1 may be executed (e.g. in 420 shown in method 400), and the instruction pointer may be moved to the next instruction (e.g. to the first machine code instruction 502-2, e.g. having an opcode or machine code equivalent 0xe1b04000 shown in FIG. 5D) for execution. In other words, an execution of the machine code program 511 including the second machine code instruction 506-8 may subsequently be continued until, for example, the test suite is completed.

Since the execution of the machine code program 511 may be based on the test suite, reinstatement of an original first machine code instruction (e.g. by the exception handler corresponding to the second machine code instruction) may depend on the test suite. Illustratively, in the example shown in FIG. 5C, the test suite may execute the second machine code instruction 506-1 and not the second machine code instruction 506-8. Accordingly, in the example shown in FIG. 5C, the second machine code instruction 506-1 may be replaced by the original first machine code instruction 504-1 and the second machine code instruction 506-8 may not be replaced by the original first machine code instruction 504-8.

The memory that may store the machine code program 511 may, for example, be dumped to a computer (e.g. a personal computer) (in 422) for post-processing (in 424). The post-processing (in 424) may search for the unexecuted second machine code instruction 506-8 (e.g. ARM UNDEF instruction) that may remain in the machine code program 511 after execution of the test suite. This search may, for example, be performed in a binary content of the machine code program 511. Subsequently, the unexecuted second machine code instruction 506-8 (e.g. ARM UNDEF instruction) may be interleaved with assembly code, and a report (e.g. HTML report) may be generated (in 426).

Accordingly, the second machine code instruction 506-8 that may remain in the machine code program 511 after execution of the test suite, may provide an indication that the second machine code instruction 506-8 is not executed (e.g. in a hardware device). This may in turn provide an indication that first machine code instruction 502-8 that was replaced by the second machine code instruction 506-8 might not have been executed had the test suite been run on the machine code program 502 including the plurality of first machine code instructions 502-1 to 502-8. With this indication, another test suite may be designed (e.g. written) to specifically test an execution of the unexecuted second machine code instruction 506-8.

The description that follows gives various examples that compare a host-based method for determining code coverage with the method 200 and/or the method 400 which determine whether a machine code instruction of a machine code program is executed.

FIG. 6A shows a machine code program 600 that may be used to check a flow control in a DMA (Direct Memory Access) configuration.

In particular, the machine code program 600 may be used to check whether a flow control in the DMA (Direct Memory Access) configuration is within an allowed range.

As described above, an execution of the instructions of the machine code program 600 may depend on the test suite used to run the machine code program 600. For example, the test suite may test all possibilities of the flow control, but may not test for an invalid flow control value. For example, there may be no test case in the test suite to test whether a flow control value may be set as greater than, for example, an particular value. In such an example, the instruction 602 may not be executed. The non-execution of the instruction 602 may be detected by the method 200 shown in FIG. 2 and/or the method 400 shown in FIG. 4. Accordingly, another test suite may be designed (e.g. written) to test the execution of the instruction 602, thus increasing the code coverage of the machine code program 600.

FIG. 6B shows a report 601 that may be generated in case a software program performing an identical function as the machine code program 600 in FIG. 6A is tested by a host-based method for determining code coverage.

As shown in FIG. 6B, the report 601 does not clearly identify which instruction is executed and which instruction is not executed. Instead, the report 601 merely reports branching in the lines of a source code. In other words, the report 601 indicates whether a line is executed or not, regardless of whether an instruction of the line is executed or not. In contrast, the method 400 and/or the method 200 indicated whether an instruction is executed or not, thus improving the granularity of the test report, and consequently improving the accuracy of testing.

FIG. 7A shows a machine code program 700 that may include a plurality of conditional instructions.

As described above, an execution of the instructions of the machine code program 700 may depend on the test suite used to run the machine code program 700. For example, the test suite may execute the conditional instructions of the machine code program 700 in case a symbolic value is set to, for example, "1". In other words, the conditional instructions of the machine code program 700 may not be executed in case the symbolic value is set to any other value, e.g. "0". In such an example, the instruction 702 may not be executed. The non-execution of the instruction 702 may be detected by the method 200 shown in FIG. 2 and/or the method 400 shown in FIG. 4. Accordingly, another test suite may be designed (e.g. written) to test the execution of the instruction 702, thus increasing the code coverage of the machine code program 700.

FIG. 7B shows a report 701 that may be generated in case a software program performing an identical function as the machine code program 700 in FIG. 7A is tested by a host-based method for determining code coverage.

As shown in FIG. 7B, the report 701 does not clearly identify which instruction is executed and which instruction is not executed. Instead, the report 701 merely reports branching in the lines of the source code. In other words, the report 701 indicates whether a line is executed or not, regardless of whether an instruction of the line is executed or not. In contrast, the method 400 and/or the method 200 indicated whether an instruction is executed or not, thus improving the granularity of the test report and consequently improving the accuracy of testing.

As described above, host-based method for determining code coverage may not simulate and/or validate system OS (Operating System) functionalities. In other words, the code coverage that may be obtained via host-based method for determining code coverage may not be based on a real system behavior (e.g. behavior on a hardware device).

On the other hand, the method 200 and/or the method 400 may test and/or validate OS functionalities, and unexecuted instructions may be identified.

FIG. 8 shows a software program 800 that may test an OS (Operating System) functionality.

The instructions 802 which may test an OS functionality (e.g. a failure to create a semaphore) may not be executed in a host-based method for determining code coverage. Accordingly, the instructions 802 may not be tested in a host-based method for determining code coverage. However, in the method 200 and/or the method 400, the OS functionality provided by the instructions 802 may be tested, and in case the instructions 802 are not executed during testing, this may be detected by the method 200 and/or the method 400.

Figure 9:
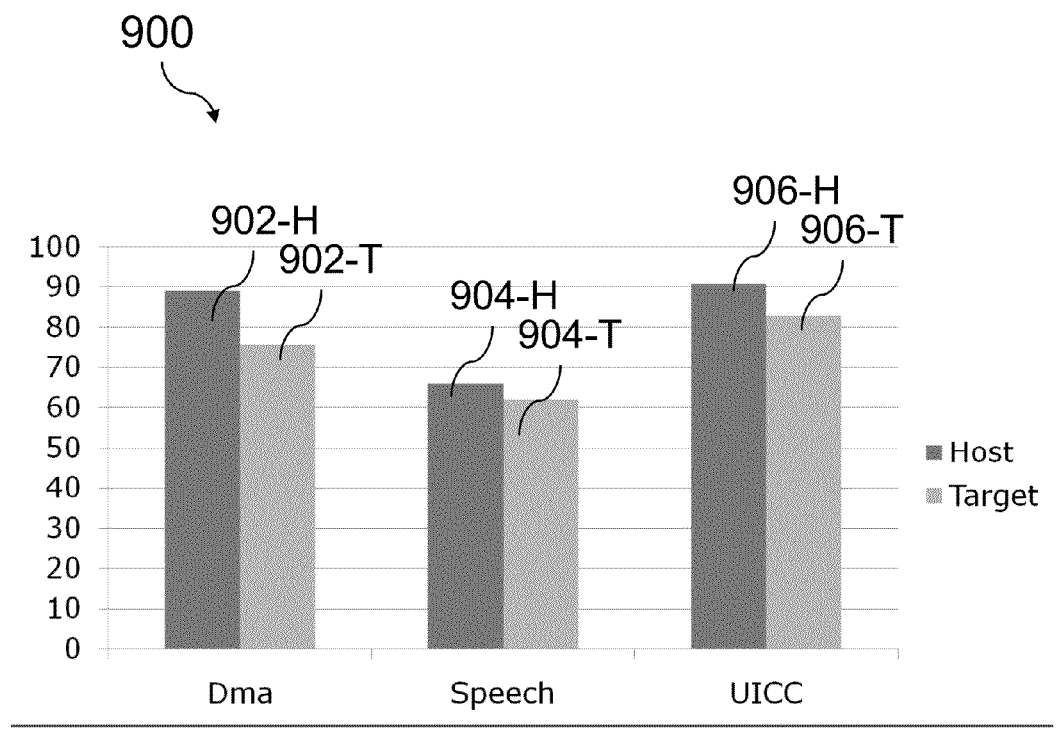
FIG. 9 shows a comparison of code coverage determined by a host-based method for determining code coverage and by a target-based method for determining code coverage for various hardware devices.

FIG. 9 shows a comparison of code coverage determined by a host-based method for determining code coverage and by a target-based method for determining code coverage for various hardware devices.

As shown in FIG. 9, the code coverage 902-H determined by a host-based method run on a simulated hardware abstraction layer of a DMA is about 89%, while the code coverage 902-T determined by a target-based method implemented on an actual DMA hardware device is about 76%. In other words, the host-based method may over-estimate the portion of code that is tested. The target-based method may provide a more accurate indication of how much code is tested (e.g. by determining whether a machine code instruction is executed or not).

A similar observation may be seen in the code coverage 904-H determined by a host-based method run on a simulated hardware abstraction layer of a speech processor (which is about 66%) and a target-based method implemented on an actual speech processor (which is about 62%).

A similar observation may be seen in the code coverage 906-H determined by a host-based method run on a simulated hardware abstraction layer of a UICC (Universal Integrated Circuit Card) (which is about 91%) and a target-based method implemented on an actual UICC (which is about 83%).

Figure 10:
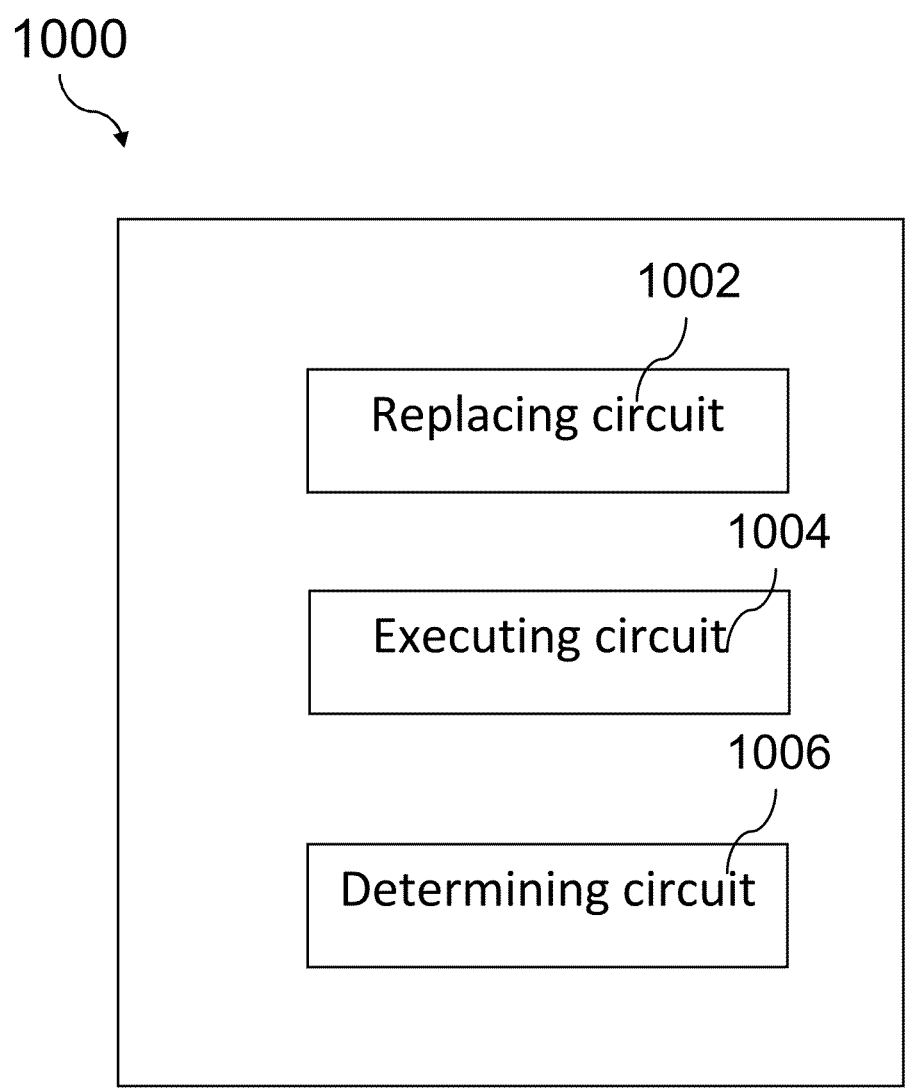
FIG. 10 shows a device for determining whether a machine code instruction of a machine code program is executed in the machine code program.

FIG. 10 shows a device 1000 for determining whether a machine code instruction of a machine code program is executed in the machine code program.

The device 1000 may include a replacing circuit 1002, an executing circuit 1004, and a determining circuit 1006.

The word "circuit" is used herein to mean any kind of a logic implementing entity, which may be special purpose circuitry or processor executing software stored in a memory, firmware, or any combination thereof. Thus, in one or more examples, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Different circuits can thus also be implemented by the same component, e.g. by a processor executing two different programs.

The replacing circuit 1002 may be configured to replace at least a part of a first machine code instruction of a plurality of first machine code instructions with a second machine code instruction, wherein the second machine code instruction may be configured to generate a code exception.

The executing circuit 1004 may be configured to execute the machine code program including the second machine code instruction.

The determining circuit 1006 may be configured to determine whether the second machine code instruction is executed based on the code exception. For example, the determining circuit 1006 may determine that the second machine code instruction is executed in case the code exception is generated. By way of another example, the determining circuit 1006 may determine that the second machine code instruction is not executed in case no code exception is generated.

According to various examples described herein, a method for determining whether a machine code instruction of a machine code program is executed in the machine code program may be provided. The method may include: replacing at least a part of a first machine code instruction of a plurality of first machine code instructions with a second machine code instruction, the second machine code instruction configured to generate a code exception; executing the machine code program including the second machine code instruction; and determining whether the second machine code instruction is executed based on the code exception.

The second machine code instruction may be determined as executed in case the code exception is generated.

The second machine code instruction may be determined as not executed in case no code exception is generated.

The first machine code instruction may include a conditional field and an instruction field, and replacing at least the part of the first machine code instruction may include replacing the instruction field of the first machine code instruction with the second machine code instruction.

The code exception may be generated in case the second machine code instruction is executed in the machine code program including the second machine code instruction.

The code exception may trigger an execution of an exception handler.

The exception handler may be stored at an exception memory address.

The second machine code instruction may be stored at a memory address.

Executing the machine code program including the second machine code instruction may include: executing the machine code program including the second machine code instruction based on a test suite, the test suite for testing the machine code program including the first machine code instruction.

Executing the machine code program including the second machine code instruction may include: generating the code exception in case an exception instruction is executed in the machine code program including the second machine code instruction.

The exception instruction may include at least one of a reset instruction, an undefined instruction, a software interrupt instruction, a prefetch abort instruction, a data abort instruction, an interrupt request instruction and a fast interrupt request instruction.

The exception instruction may be stored at a memory address.

Determining whether the second machine code instruction is executed based on the code exception may include: comparing the second machine code instruction with the exception instruction that generated the code exception.

Determining whether the second machine code instruction is executed based on the code exception further may include: determining whether the second machine code instruction is executed based on a result of the comparison.

The second machine code instruction may be determined as executed in case the exception instruction that generated the code exception is identical to the second machine code instruction.

The second machine code instruction may be determined as not executed in case the exception instruction that generated the code exception is different from the second machine code instruction.

The method may further include: storing the machine code program including the plurality of first machine code instructions.

The method may further include: generating a copy of the machine code program including the plurality of first machine code instructions.

The copy of the machine code program may be generated before replacing at least a part of the first machine code instruction with the second machine code instruction.

The method may further include: storing the copy of the machine code program including the plurality of first machine code instructions.

The method may further include: generating a mapping between the machine code program and the copy of the machine code program.

Generating the mapping may include: generating a mapping between a machine code instruction of the machine code program and an identical instruction of the copy of the machine code program.

The first machine code instruction may include a machine code instruction for execution in hardware device designed according to an Advanced Reduced Instruction Set Computing Machine (ARM) architecture.

The second machine code instruction may include an undefined instruction configured according to a machine language.

The machine language may be an Advanced Reduced Instruction Set Computing Machine (ARM) language, and the undefined instruction may be an ARM undefined instruction.

The method may further include: reinstating the part of the first machine code instruction replaced by the second machine code instruction in case the second machine code instruction is determined to be executed.

The method may further include: executing the reinstated first machine code instruction.

According to various examples described herein, a method for testing whether a first machine code instruction of a machine code program is executed in a machine code program when processing the machine code program may be provided. The method may include: replacing at least a part of the first machine code instruction of a plurality of first machine code instructions with a second machine code instruction, the second machine code instruction configured to generate a code exception; executing the amended machine code program including the second machine code instruction; and determining whether the first machine code instruction based on the code exception.

The first machine code instruction may be determined as executed in case the code exception is generated.

The first machine code instruction may be determined as not executed in case no code exception is generated.

According to various examples described herein, a device for determining whether a machine code instruction of a machine code program is executed in the machine code program is provided. The device may include: a replacing circuit configured to replace at least a part of a first machine code instruction of a plurality of first machine code instructions with a second machine code instruction, the second machine code instruction configured to generate a code exception; an executing circuit configured to execute the machine code program including the second machine code instruction; and a determining circuit configured to determine whether the second machine code instruction is executed based on the code exception.

The determining circuit may determine that the second machine code instruction is executed in case the code exception is generated.

The determining circuit may determine that the second machine code instruction is not executed in case no code exception is generated.

Various examples and aspects described in the context of one of the devices or methods described herein may be analogously valid for the other devices or methods described herein.

While various aspects have been particularly shown and described with reference to these aspects of this disclosure, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A method for determining whether a machine code instruction of a machine code program is executed in the machine code program, the method comprising:
    replacing at least a part of a first machine code instruction of a plurality of first machine code instructions with a second machine code instruction, the second machine code instruction configured to generate a code exception;
    executing the machine code program comprising the second machine code instruction; and
    determining whether the second machine code instruction is executed based on the code exception;
    wherein at least a part of the first machine code instruction controls whether the second machine code instruction is executed.

2. The method of claim 1, wherein the second machine code instruction is determined as executed in the case that the code exception is generated.

3. The method of claim 1, wherein the second machine code instruction is determined as not executed in the case that no code exception is generated.

4. The method of claim 1, wherein the first machine code instruction comprises a conditional field and an instruction field, and wherein replacing at least the part of the first machine code instruction comprises replacing the instruction field of the first machine code instruction with the second machine code instruction.

5. The method of claim 1, wherein the code exception is generated in the case that the second machine code instruction is executed in the machine code program comprising the second machine code instruction.

6. The method of claim 1, wherein the code exception triggers an execution of an exception handler.

7. The method of claim 1, wherein executing the machine code program comprising the second machine code instruction comprises:
    executing the machine code program comprising the second machine code instruction based on a test suite, wherein the test suite is for testing the machine code program comprising the first machine code instruction.

8. The method of claim 1, wherein executing the machine code program comprising the second machine code instruction comprises:
    generating the code exception in the case that an exception instruction is executed in the machine code program comprising the second machine code instruction.

9. The method of claim 1, further comprising:
    storing the machine code program comprising the plurality of first machine code instructions.

10. The method of claim 1, further comprising:
    generating a copy of the machine code program comprising the plurality of first machine code instructions.

11. The method of claim 10, wherein the copy of the machine code program is generated before replacing at least a part of the first machine code instruction with the second machine code instruction.

12. The method of claim 10, further comprising:
    storing the copy of the machine code program comprising the plurality of first machine code instructions.

13. The method of claim 10, further comprising:
    generating a mapping between the machine code program and the copy of the machine code program.

14. The method of claim 1, wherein the first machine code instruction comprises a machine code instruction for execution in hardware device designed according to an Advanced Reduced Instruction Set Computing Machine (ARM) architecture.

15. The method of claim 14, wherein the machine language is an Advanced Reduced Instruction Set Computing Machine (ARM) language, and wherein the undefined instruction is an ARM undefined instruction.

16. The method of claim 1, wherein the second machine code instruction comprises an undefined instruction configured according to a machine language.

17. The method of claim 1, further comprising:
    reinstating the part of the first machine code instruction replaced by the second machine code instruction in the case that the second machine code instruction is determined to be executed.

18. A method for testing whether a first machine code instruction of a machine code program is executed in a machine code program when processing the machine code program, the method comprising:
    replacing at least a part of the first machine code instruction of a plurality of first machine code instructions with a second machine code instruction, the second machine code instruction configured to generate a code exception;
    executing the amended machine code program comprising the second machine code instruction; and
    determining whether the first machine code instruction is executed based on the code exception;
    wherein at least a part of the first machine code instruction controls whether the second machine code instruction is executed.

19. The method of claim 18,
    wherein the first machine code instruction is determined as executed in the case that the code exception is generated.

20. A device for determining whether a machine code instruction of a machine code program is executed in the machine code program, the device comprising:
- a replacing circuit comprising a first processor configured to replace at least a part of a first machine code instruction of a plurality of first machine code instructions with a second machine code instruction, the second machine code instruction configured to generate a code exception;
- an executing circuit comprising a second processor configured to execute the machine code program comprising the second machine code instruction; and
- a determining circuit comprising a third processor configured to determine whether the second machine code instruction is executed based on the code exception;

wherein at least a part of the first machine code instruction controls whether the second machine code instruction is executed.

21. The device of claim 20, wherein the determining circuit determines that the second machine code instruction is executed in the case that the code exception is generated.

22. The device of claim 20, wherein the determining circuit determines that the second machine code instruction is not executed in the case that no code exception is generated.

* * * * *